US012596363B2

(12) United States Patent
Werner et al.

(10) Patent No.: US 12,596,363 B2
(45) Date of Patent: Apr. 7, 2026

(54) DETERMINING COMPONENT PART COMBINATION USING ARTIFICIAL INTELLIGENCE

(71) Applicant: INTERNATIONAL BUSINESS MACHINES CORPORATION, Armonk, NY (US)

(72) Inventors: John S. Werner, Fishkill, NY (US); Ryan Mulhern, Mahopac, NY (US); Dane Warren, Highland, NY (US); Arkadiy O. Tsfasman, Wappingers Falls, NY (US); Charles Bene, Poughkeepsie, NY (US); Noah Singer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 17/806,972

(22) Filed: Jun. 15, 2022

(65) Prior Publication Data

US 2023/0409023 A1     Dec. 21, 2023

(51) Int. Cl.
G05B 23/02         (2006.01)
G06Q 10/20        (2023.01)

(52) U.S. Cl.
CPC ......... *G05B 23/0283* (2013.01); *G06Q 10/20* (2013.01); *G05B 2223/02* (2018.08)

(58) Field of Classification Search
CPC ............ G05B 23/0283; G05B 2223/02; G06Q 10/20; G06Q 50/04; G06F 2111/20;
(Continued)

(56) References Cited

U.S. PATENT DOCUMENTS 10,147,041 B2   12/2018  Gao
10,282,378 B1 *  5/2019  Eusebi .................. G06F 16/285
(Continued)

FOREIGN PATENT DOCUMENTS

CN          101872160 B      10/2010

OTHER PUBLICATIONS

Zhicheng Zhu, Multi-component Maintenance Optimization: A Stochastic Programming Approach, 2020, [online]. [retrieved on Jun. 8, 2025] retrieved from internet: <https://par.nsf.gov/servlets/purl/10187928> (Year: 2020).*
(Continued)

*Primary Examiner* — Robert E Fennema
*Assistant Examiner* — Marzia T Monty
(74) *Attorney, Agent, or Firm* — Eric W. Chesley

(57)          ABSTRACT

Described are techniques for artificial intelligence (AI) assisted recommendations for component parts for end-products that reduce the occurrence of a product failures. The techniques include obtaining measurement data for groups of component parts configured to be assembled as part of an end-product. The techniques further include obtaining specification scores for the component parts included in the groups of component parts based on the measurement data. The techniques further include selecting a component part combination from the groups of component parts using artificial intelligence analysis of the specification scores to determine that the component part combination decreases a probability of a product failure as compared to historical occurrences of the product failure. The techniques further include outputting information for at least one component part included in the component part combination.

20 Claims, 8 Drawing Sheets

(58) Field of Classification Search
CPC ...... G06F 2119/02; G06F 30/27; G06F 30/17; G06N 5/041; G06N 20/00
See application file for complete search history.

(56) References Cited

U.S. PATENT DOCUMENTS

| | | | |
|---|---|---|---|
| 10,360,601 B1 | 7/2019 | Adegan | |
| 10,417,614 B2 | 9/2019 | Johnson | |
| 10,581,974 B2 | 3/2020 | Sustaeta | |
| 10,824,140 B2 | 11/2020 | Cella | |
| 2010/0274612 A1 | 10/2010 | Walker | |
| 2019/0236249 A1* | 8/2019 | Pavlou | G06F 21/554 |
| 2019/0316902 A1* | 10/2019 | Sparago | G06F 17/18 |
| 2020/0026590 A1* | 1/2020 | Lopez | G05B 23/0243 |
| 2020/0111015 A1* | 4/2020 | Liu | G06N 7/01 |
| 2021/0025383 A1* | 1/2021 | Bodishbaugh | F04B 47/02 |
| 2021/0057050 A1* | 2/2021 | Zavoronkovs | G06N 3/047 |
| 2022/0050733 A1* | 2/2022 | Selvaraju | G06N 20/00 |
| 2022/0207493 A1* | 6/2022 | Sertbas | G06Q 10/20 |

OTHER PUBLICATIONS

Bagajewicz, M.;"Optimal Preventive Maintenance Scheduling in Process Plants", May 2, 2008, 27 Pgs.
Disclosed Anonymously, "Anticipatory Product Development Using Design Suggestions", An IP.com Prior Art Database Technical Disclosure, IP.com No. IPCOM000252104D;, Dec. 15, 2017, 34 Pgs.
Disclosed Anonymously, "A Technique and Mechanism to Balance a Kubernetes Cluster by Detecting and Redistributing Unbalanced Workloads Across the Nodes of a Kubernetes Cluster", An IP.Com Prior Art Database Technical Disclosure, IP.com No. IPCOM000267914D, Dec. 3, 2021, 7 Pgs.
Disclosed Anonymously, "Intelligent Maintenance Scheduler Based on Contextual Analysis", An ip.com Prior Art Database Technical Disclosure, IP.com No. IPCOM000266230D, Jun. 24, 2021, 11 Pgs.
Disclosed Anonymously, ; "AI Aware System to Cognitively Extract Issue Severity Based on User Reversal Behavioral Indicators", An IP. com Prior Art Database: Technical Disclosure, IP.com No. IPCOM000265559D, Apr. 23, 2021, 6 Pgs.
Kleyner, A. et al.; "Minimizing Cycle Cost by Managing Product Reliability via Validation Plan and Warranty Return Cost", ScienceDirect, Int. J. Production Economics 112 (2008) 796-807, 13 Pgs, www.sciencedirect.com>.
Mell et al., "The NIST Definition of Cloud Computing", National Institute of Standards and Technology, Special Publication 800-145, Sep. 2011, 7 pages.
Wang, W. et al.; "Qualification for Product Development", University of Maryland, 2008 International Conference on Electronic Packaging Technology & High Density Packaging (ICEPT-HDP 2008) 978-1-4244-2740-6/08/© 2008 IEEE, 12 Pgs.

* cited by examiner

Figure 4:
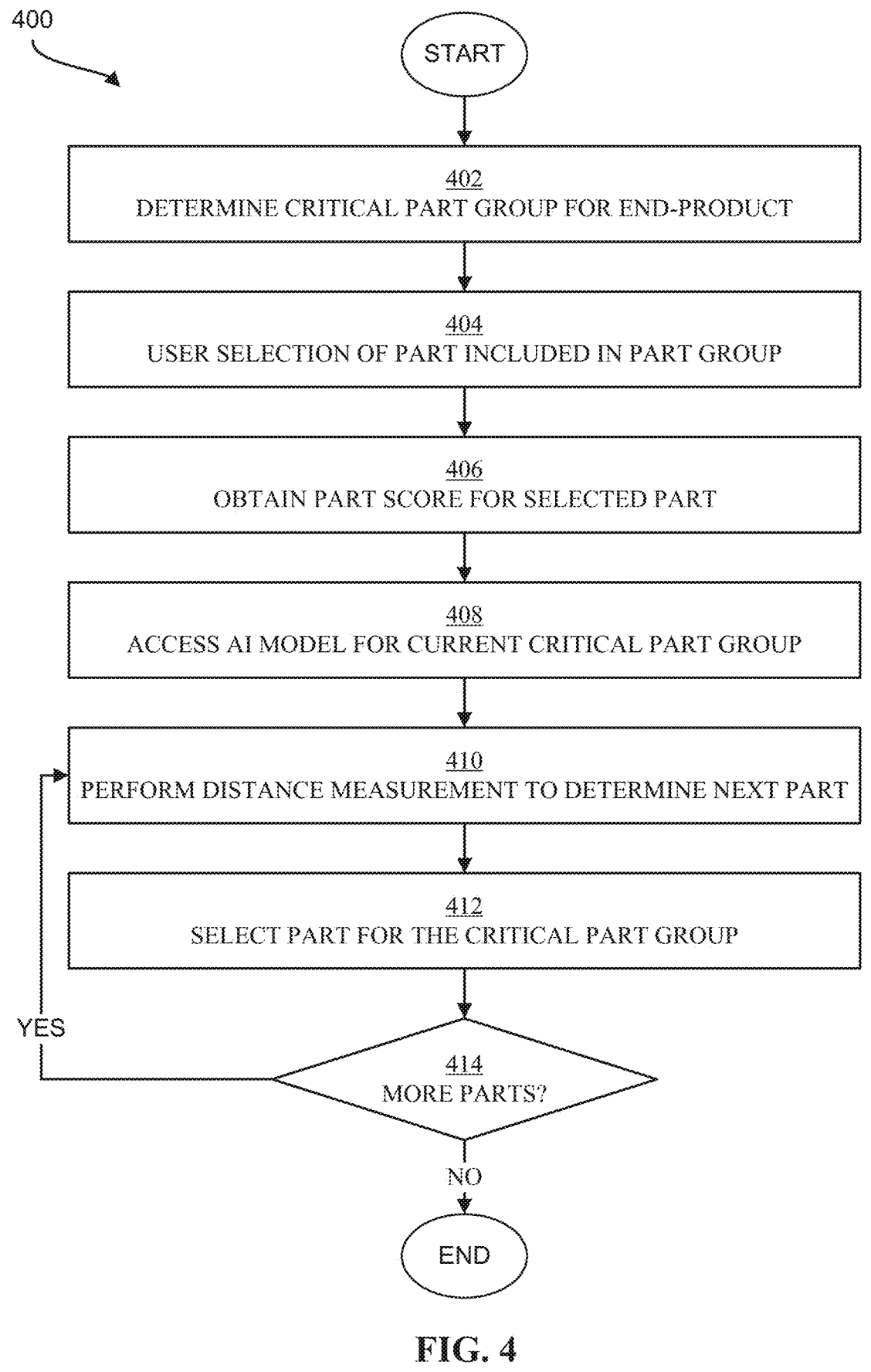

400

( START )

402
DETERMINE CRITICAL PART GROUP FOR END-PRODUCT

404
USER SELECTION OF PART INCLUDED IN PART GROUP

406
OBTAIN PART SCORE FOR SELECTED PART

408
ACCESS AI MODEL FOR CURRENT CRITICAL PART GROUP

410
PERFORM DISTANCE MEASUREMENT TO DETERMINE NEXT PART

412
SELECT PART FOR THE CRITICAL PART GROUP

414
MORE PARTS?

YES

NO ( END )

---

502
Obtain measurement data for groups of component parts configured to be assembled as part of an end-product, wherein the measurement data comprises measurement specifications and actual measurements for interfacing portions of component parts included in the groups of component parts

---

504
Obtain specification scores for the component parts included in the groups of component parts, wherein the specification scores are based at least in part on the measurement specifications and the actual measurements for the interfacing portions of the component parts

---

506
Select a component part combination from the groups of component parts using artificial intelligence analysis of the specification scores to determine that the component part combination decreases a probability of a product failure as compared to historical occurrences of the product failure

---

508
Output information for at least one component part included in the component part combination

DETERMINING COMPONENT PART COMBINATION USING ARTIFICIAL INTELLIGENCE

BACKGROUND

The present disclosure generally relates to artificial intelligence modeling, and, more specifically, to mechanisms for minimizing end-product failures by providing artificial intelligence mechanisms to assist with selection of component parts for end-products.

An end-product is assembled from many component parts which conform to a design specification that typically comprises a small range that allows for some manufacturing tolerance. Illustratively, a design specification for a component part can specify a dimension, torque, weight, time, temperature, quantity, luminosity, voltage, current, impedance, and the like. Even when component parts of an end-product meet a design specification when initially assembled, it is not uncommon for one or more of the component parts to fail over time, thereby compromising operation of the end-product and/or rendering the end-product unusable until the component part is replaced.

SUMMARY

Aspects of the present disclosure are directed toward a computer-implemented method comprising obtaining measurement data for groups of component parts configured to be assembled as part of an end-product, wherein the measurement data comprises measurement specifications and actual measurements for interfacing portions of component parts included in the groups of component parts. The method further comprises obtaining specification scores for the component parts included in the groups of component parts, wherein the specification scores are based at least in part on the measurement specifications and the actual measurements for the interfacing portions of the component parts. The method further comprises selecting a component part combination from the groups of component parts using artificial intelligence analysis of the specification scores to determine that the component part combination decreases a probability of a product failure as compared to historical occurrences of the product failure. The method further comprises outputting information for at least one component part included in the component part combination.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the present disclosure.

FIG. 4 is a flow diagram illustrating an example method for obtaining an AI assisted component part combination recommendation, in accordance with some embodiments of the present disclosure.

FIG. 5 is a flow diagram illustrating an example method for an AI assisted product-build service, in accordance with some embodiments of the present disclosure.

FIG. 6 illustrates a block diagram of an example computer, in accordance with some embodiments of the present disclosure.

Figure 1:
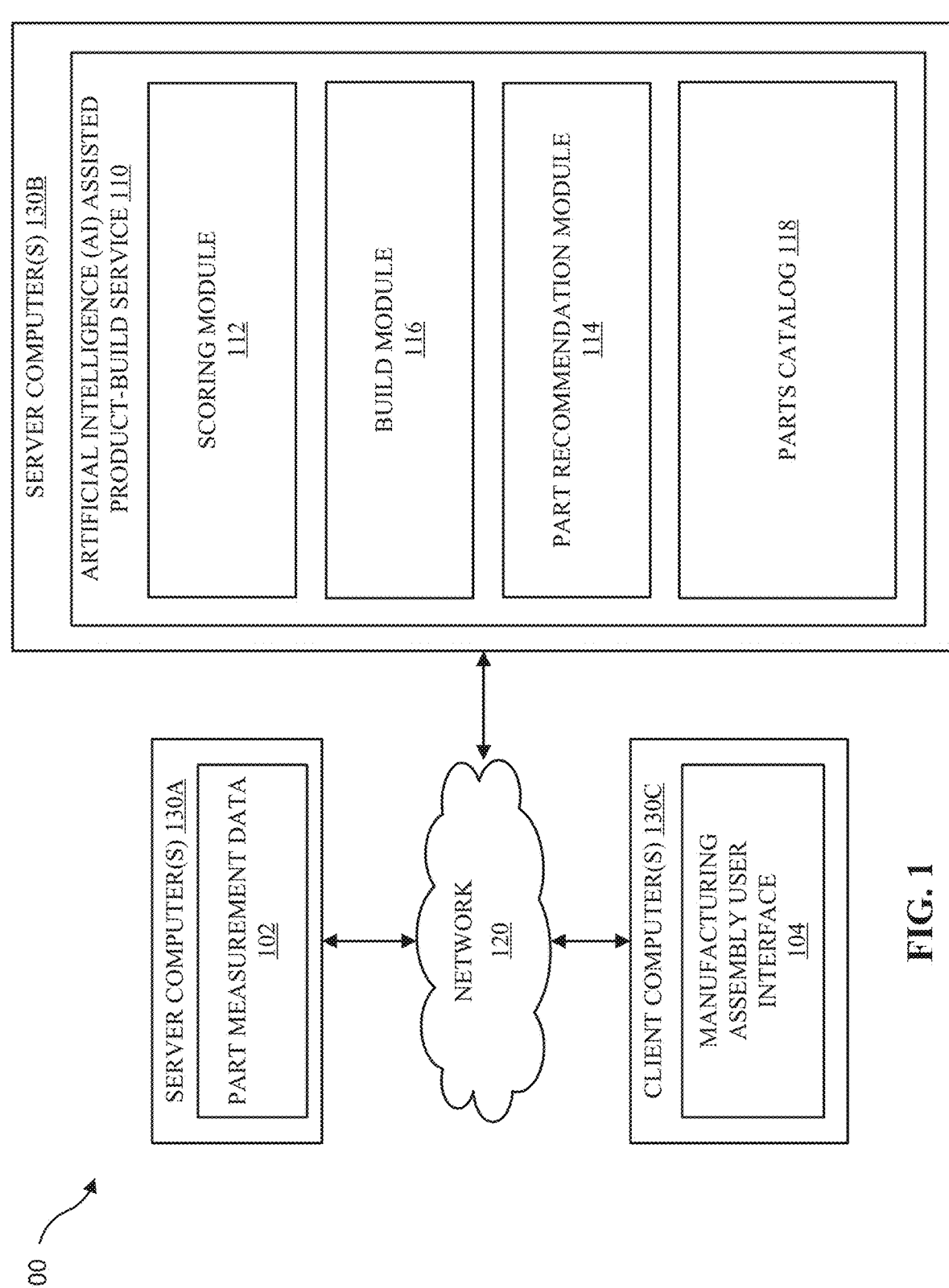
FIG. 1 is a block diagram illustrating an example computational environment implementing an artificial intelligence (AI) assisted product-build service, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward an artificial intelligence assisted technology for recommending component parts for end-products to reduce the occurrence of product failures. While not limited to such applications, embodiments of the present disclosure may be better understood in light of the present disclosure.

In general, in accordance with some illustrative embodiments, an artificial intelligence (AI) model is provided and implemented within an end-product manufacturing and/or servicing environment. The AI model can be implemented as one or more computing devices specifically configured to provide a cognitive capability, and thus, can include a cognitive computing system configured with specific computing logic to learn manufacturing concepts for a particular end-product and to assist in assembly of the end-product.

An end-product can include component parts that, when combined, perform one or more functions of the end-product. An end-product can be a final product, or a sub-component of another end-product, such as, for example, a subcomponent (e.g., oil pump, alternator, throttle, etc.) of a combustible engine. Each component part of an end-product can have an individual manufacturing specification. However, in a scenario where each component part meets its design specification, but each component part falls toward opposite extremes of their tolerance range (e.g., part A is on the larger side of its tolerance range and part B is on the smaller side of its tolerance range), one or more of the component parts tend to fail over time. Consequently, component parts that fall toward opposite extremes of their tolerance range can cause and/or contribute to a failure of an end-product. Also, component parts that fall toward opposite extremes of their tolerance range may be discarded even though each component part meets its own design specification. Discarding these component parts can be wasteful and increase costs to the manufacturer of the end-product and their customers.

Advantageously, aspects of the present disclosure overcome the challenges above by implementing an AI model to assist in determining component parts used in an assembly of an end-product. One of the benefits of AI modeling is the ability to more accurately (and quickly) perform observations and evaluations using large sets of data that could not otherwise be performed by a human. Accordingly, as an example advantage, aspects of the present disclosure assign specification scores to component parts that are based-in-part on specifications for the component parts and determines, via artificial intelligence analysis, a set of component parts for assembly of an end-product that reduces the likelihood of a product failure attributable to the set of component parts. As another example advantage, aspects of the present disclosure utilize the artificial intelligence analysis to identify a set of component parts that border on one end of their tolerance range, but when combined, interface with a higher degree of precision and accuracy as compared to an interface between component parts that fall toward opposite extremes of their tolerance range.

Referring now to the figures, FIG. 1 is a block diagram illustrating an example computing environment used to implement a system 100 for recommending component parts for assembly of an end-product using an AI model, in accordance with some embodiments of the present disclosure. In some embodiments, the system 100 can be directed to critical parts of an end-product. As described herein, a critical part or critical part group are component parts of an end-product that have been identified as being contributory to the durability of the end-product. Analysis of product failures (e.g., a product state or condition that does not meet an intended function, objective, or expectation) can be performed to identify component parts and combination of component parts that contributed and/or caused a failure of an end-product. In some embodiments, information associated with performance of an end-product (e.g., product make and model) can be obtained from logs and/or records containing data collected for products that have been operating in the field, such as when a user upgrades from a previous generation of an end-product to a new version of the end-product (e.g., a server upgrade where performance logs generated by the previous generation server can be obtained). As another example, information about end-product performance can be obtained from engineering data, lab testing, and/or publicly available information (e.g., performance data from prior models or similar components used in other applications). In some embodiments, machine learning techniques can be used to analyze data sets obtained from various sources and determine component parts that contributed to the failure of an end-product.

As shown in FIG. 1, the system 100 can include a plurality of network connected computers 130A-C (clients 130C and servers 130A-B) to host various software modules and data used to implement the system 100, including, an AI assisted product-build service 110, a manufacturing assembly user interface 104, and part measurement data 102. The part measurement data 102 can include measurements for portions and aspects of component parts used to construct an end-product. In some embodiments, the part measurement data 102 can be limited to critical parts (component parts that have been identified as being critical to the durability of an end-product). Illustratively, the part measurement data 102 can comprise dimensions, torque, weight, time, temperature, quantity, luminosity, voltage, current, impedance, and other measurements based on the type of component part. The part measurement data 102 is associated with a portion or aspect of a component part configured to interface (e.g., attach, connect, couple, communicate, combine, join, link, weld, and the like) with another component part(s). As a non-limiting example, part measurement data 102 for a dowel pin configured to be inserted into a bracket can be limited to a diameter measurement of the dowel pin, and part measurement data 102 for the bracket can be limited to a hole diameter measurement configured to receive the dowel pin. As another non-limiting example, part measurement data 102 for a water pump casing configured to house an impeller can be limited to an upper volute, and part measurement data 102 for the impeller can be limited to the upper portion of the impeller to ensure there is sufficient space between the volute and impeller.

The part measurement data 102 can be obtained using various measurement tools to measure the portions and aspects of the component parts. The measurement tools used to measure the component parts can vary based on the type of component part and the specification measurement used for the type of component part. Illustratively, measurement tools can include, but are not limited to, a caliper, micrometer, ruler, scale, torque meter, multimeter, voltmeter, current clamp, sensors, and the like.

In some embodiments, the part measurement data 102 can be generated by an automated system that includes sensors, controls, and actuators designed to measure portions and aspects of component parts and output part measurement data 102. For example, a sensor based visual measurement system that uses vision sensors to obtain component part measurements can be used to generate the part measurement data 102. In some embodiments, a user can provide the part measurement data 102 using a measurement tool and entering the measurement into a computer (e.g., 130A).

In some embodiments, the part measurement data 102 can be provided by a supplier of a component part who performs the measurements of the component parts determined to be critical and provides the part measurement data 102 to the customer of the component part. Also, in some embodiments, component parts can be sorted and separated (either at a supplier location prior to shipment or when received by the end-product manufacturer) according to their respective measurements into groups (e.g., small, medium, large). Also, component parts from a same bin, batch, or lot can be grouped together to prevent mixing of component parts that may be in the lower or upper limits of the component part's specification.

The part measurement data 102 can be stored in a parts catalog 118 (an electronic database of component parts) to make the part measurement data 102 available to the AI assisted product-build service 110. In some embodiments, the parts catalog 118 contains information for those component parts that are readily available (e.g., on premises) to be used in assembling an end-product. The parts catalog 118 can comprise data records for individual component parts. A data record for a component part can include, but is not limited to: a unique part identifier (e.g., serial number, stock-keeping unit (SKU), universal product code (UPC), etc.), bin number, manufacturer identifier, manufacture date, supplier identifier, part measurement data 102 for various portions or aspects of the component part (e.g., dimensions, torque, weight, time, temperature, quantity, luminosity, voltage, current, impedance, and other measurements for specific aspects of the component part), component part specifications (including allowable tolerance range(s)), interdependent part identifiers (e.g., interdependent parts combined with the component part to make a subcomponent or end-product), critical part designation, availability and location (e.g., availability status and manufacturing location status), and other information for the component part. In some embodiments, the parts catalog 118 can include data records for only those component parts that have been identified as being critical to the durability of an end-product. In other embodiments, the parts catalog 118 can include data records for both critical and non-critical component parts used to assemble an end-product.

The AI assisted product-build service 110 assists the manufacturing process by selecting a combination of component parts for an end-product that reduces the likelihood of a product failure attributable to the combination of component parts. In some embodiments, the AI assisted product-build service 110 can be hosted in a cloud computing environment (see FIGS. 7 and 8) and the AI assisted product-build service 110 can be offered as a service to customers, such as end-product manufacturers and/or product repair servicers.

As illustrated, the AI assisted product-build service 110 can include a scoring module 112, a part recommendation module 114, a build module 116, and the parts catalog 118 described above. The scoring module 112 generates a specification score for each component part of an end-product. In some embodiments, the specification scores are generated for only those component parts identified as being critical to the durability of the end-product. The specification score indicates where (e.g., a value relative to a scale) within a specification's tolerance range a measurement (e.g., a dimension, torque, weight, time, temperature, quantity, luminosity, voltage, current, impedance, etc.) falls.

The scoring module 112 generates a specification score for a component part by obtaining from the parts catalog 118 a measurement for a portion or aspect of the component part, and a tolerance range for the portion or aspect of the component part defined by the part's specification. In some embodiments, the scoring module 112 normalizes a component part measurement to a scale of the component part's specification tolerance range. The scoring module 112 determines a placement of the measurement in the tolerance range and assigns a specification score that corresponds to the placement. The specification score can be a value or label indicating the placement of the measurement in the tolerance range.

Figure 2:
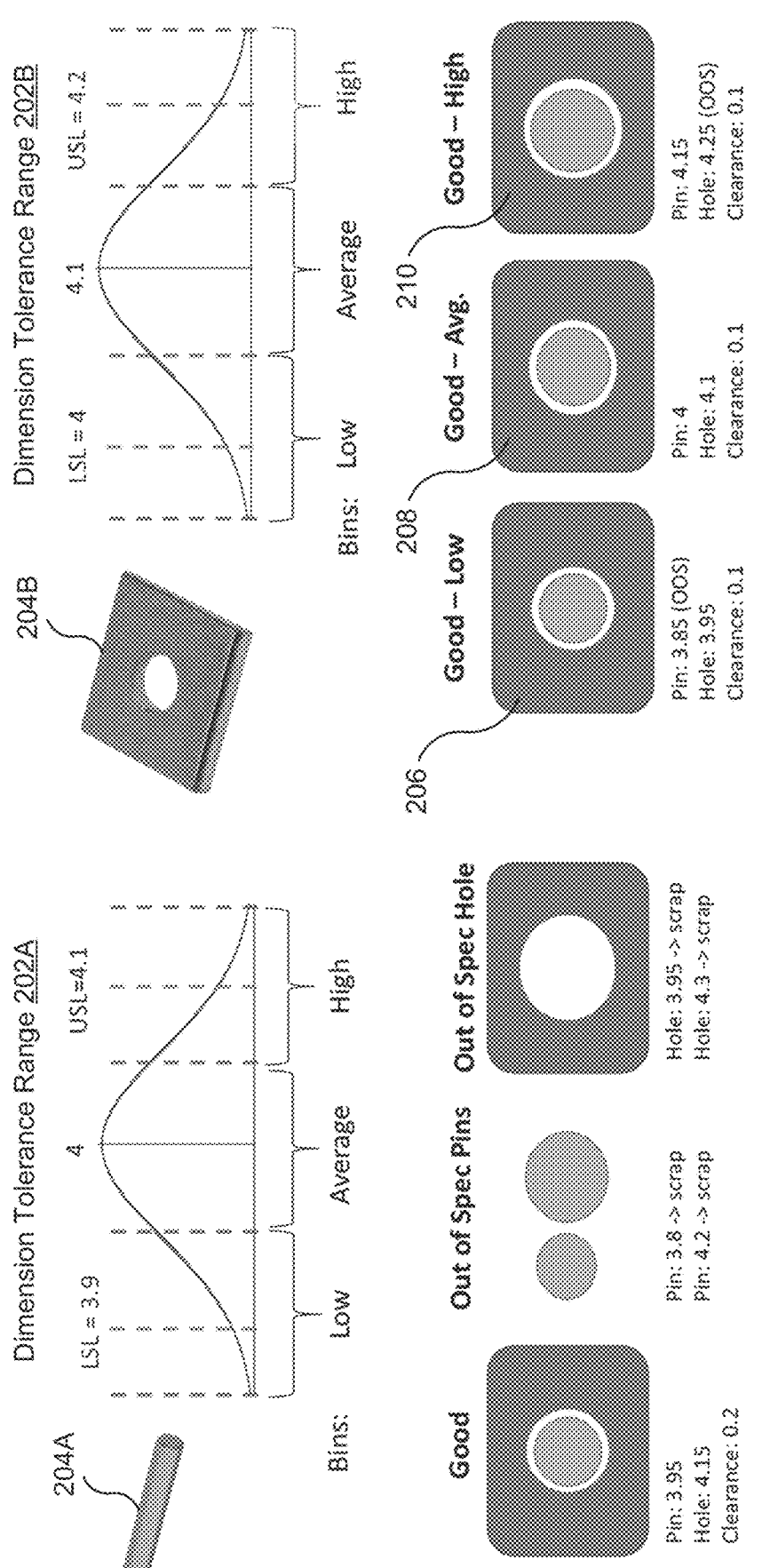
FIG. 2 provides an illustrative example of an aspect of the present disclosure using example component parts and part specifications.

As an illustrative example, FIG. 2 shows an example tolerance range 202A for a dowel pin 204A and an example tolerance range 202B for a bracket 204B. The tolerance range 202A for the dowel pin 204A defines a range of allowable diameters of the dowel pin 204A. The tolerance range 202B for the bracket 204B defines a range of allowable hole diameters of the bracket 204B. The scoring module 112 can assign a specification score to each dowel pin 204A and each bracket 204B included in an inventory of dowel pins 204A and brackets 204B. A specification score assigned to dowel pin 204A indicates where within the tolerance range 202A the diameter of the dowel pin 204A is located. A specification score assigned to a bracket 204B indicates where within the tolerance range 202B the hole diameter of the bracket 204B is located. The specification score can be a label (e.g., "low", "average", or "high") or a value (e.g., 1, 2, or 3).

It should be noted that specification scores assigned to component parts do not indicate a quality of a component part. Rather, the specification scores indicate information used to identify optimal component part combinations that reduce product failures in end-products. As an illustration, combining component parts that have measurements that fall on opposite extremes of specification tolerance ranges can result in increased failures of an end-product (e.g., when the diameter of a dowel pin 204A is on the smaller side of the tolerance range 202A and the hole diameter of a bracket 204B is on the larger side of the tolerance range 202B). As an illustrative example, even if the dimensions of component parts 204A-B fall within the their respective tolerance ranges 202A-B, combining the dowel pin 204A and the bracket 204B could end in a failure of the resulting end-product if each of the dimensions are located on opposite ends of the tolerance ranges 202A-B (e.g., when the diameter of the dowel pin 204A is on the smaller side of the tolerance range 202A and the hole diameter of the bracket 204B is on the larger side of the tolerance range 202B). The information provided by the specification scores can be used to identify component parts that can be combined to form an optimal subcomponent or end-product (e.g., the subcomponent 206 combining a smaller dowel pin and bracket, the subcomponent 208 combining an average dowel pin and bracket, and the subcomponent 210 combining a larger dowel pin and bracket).

An example method used to generate specification scores for component parts is described in more detail later in association FIG. 3. Referring again to FIG. 1, after generating a specification score for an individual component part, the scoring module 112 stores the specification score in the parts catalog 118 to make the specification score accessible to the other modules in the AI assisted product-build service 110.

The build module 116 assists a user in selecting component parts to include in an end-product using an AI model. A user interacts with the build module 116 using a manufacturing assembly (MA) user interface 104 to obtain information for recommended component part combinations used for a specific build of an end-product. In some embodiments, a user of the MA user interface 104 is a human who is involved in assembling an end-product, and the MA user interface 104 can be a command line interface, a graphical user interface, a mobile application, and the like. In other embodiments, the user is a computer program of an automated assembly system configured to receive component part information from the MA user interface 104, and the MA user interface 104 can be implemented as an application programming interface (API) to allow the computer program included in the automated assembly system to communicate with the build module 116.

The build module 116 receives user input associated with a specific build of an end-product and obtains information for a recommended component part combination to use in the build of the end-product from the part recommendation module 114. The user input can include, but is not limited to, an end-product type or model, a component part identifier (e.g., a serial number, a scanned barcode, a scanned quick response (QR) code, etc.), information for a critical part group, and/or other information associated with a specific build of an end-product. In some embodiments, the MA user interface 104 can be preconfigured to provide the input to the build module 116 (e.g., as part of an assembly line operation to allow an assembly worker to quickly obtain assembly instructions for an end-product).

In some embodiments, the build module 116 receives information for a particular component part (e.g., a preselected component part) and obtains a recommendation for component parts to combine with the particular component part. As an illustration, a user can provide information (e.g., a serial number) for a preselected component part as input to the MA user interface 104, whereupon the build module 116 obtains information for additional recommended component parts to combine with the preselected component part. In the scenario where the system 100 communicates with an automated assembly system, a unique part identifier for a preselected component part can be passed to the build module 116 as a parameter in an API call.

The build module 116, in response to a request for a recommended component part combination, obtains the information for the recommended component part combination from the part recommendation module 114. The part recommendation module 114 uses an AI model to identify a component part combination that minimizes the likelihood of a product failure that is contributable to the component part combination. The AI model is configured to learn product failure patterns using untagged datasets to determine a most optimal combination of component parts available for a current build of an individual end-product. Datasets used to train the AI model can include performance data for component parts and specification scores assigned to the component parts. The specification scores included in the training datasets correspond to the specification scores assigned to component parts described earlier. Illustratively, the performance data can include, but is not limited to data for: component parts that have no recorded failures; a length of operation prior to failure; a number of critical errors or bit errors attributable to a component part; a number of service replacements of the component part, etc.

In some embodiments, the AI model learns patterns of product failures by performing a clustering technique that groups historical data for component part combinations associated with end-product failures to identify component part combinations that are more likely to experience a failure (e.g., malfunction, breakage, part degradation, etc.) as compared to other component part combinations. AI clustering is a technique that groups data points having similar properties and/or features, thereby separating the data points from other groups that have different properties and/or features. After training the AI model, the patterns of product failures can be used by the AI model to select a most optimal combination of component parts (a combination that minimizes the likelihood of a product failure) available for a current build of an individual end-product.

In some embodiments, the AI model receives tolerance parameters used by the AI model to narrow or broaden specifications for selecting candidate component parts to include in a component part combination. As one example, a tolerance parameter can be used to limit candidate component parts to only include component part combinations that have specification scores that conform to a very narrow tolerance (e.g., to ensure a specific volume in a pump housing). As another example, a tolerance parameter can be used to expand a range of acceptable specification scores for candidate component parts to increase the number of candidate component parts available to choose from (e.g., allow a door hinge pin to be combined with a door hinge with a hole having an expanded specification score range).

Because the AI model used by the part recommendation module 114 can be implemented as a cognitive computing system executed on one or more server computing devices of a distributed data processing network, it is important to understand how cognitive systems implementing a request processing pipeline can be implemented to provide context to the illustrative embodiments that integrate cognitive systems and request processing pipeline mechanisms. It should be appreciated that the mechanisms described herein are only examples and are not intended to state or imply any limitation with regard to the type of cognitive system mechanisms with which the illustrative embodiments are implemented.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale, which could not otherwise be performed by a human. A cognitive system performs one or more computer-implemented cognitive operations that approximate a human thought process, as well as enable humans and machines to interact in a more natural manner so as to extend and magnify human expertise and cognition. A cognitive system comprises artificial intelligence logic, such as search and optimization (e.g., intelligently searching through many possible solutions), for example, and machine learning logic, which may be provided as specialized hardware, software executed on hardware, or any combination of specialized hardware and software executed on hardware. The logic of the cognitive system implements the cognitive operation(s), examples of which include, but are not limited to, search and optimization, question answering, identification of related concepts within different portions of content in a corpus, and other types of recommendation generation.

It should be appreciated that while a cognitive system may attempt to emulate human thought processes, the algorithms, operations, and configurations of the cognitive system are not the same as a human brain due to the fact that computing devices simply do not have the same architecture as a human mind and operate in a completely different way fundamentally, requiring specific configurations and logic that perform operations that a human brain does not perform, in order to emulate the results that a human brain generates. In other words, computers are not human brains, currently there is no complete understanding of how human brains operate, and thus, the human thought processes themselves cannot be duplicated, but only emulated and approximated via completely different mechanisms present in computing devices.

IBM WATSON is an example of a cognitive system which can perform search and optimization tasks with high accuracy at speeds far faster than human beings and on a larger scale. Illustratively, such cognitive systems are able to perform functions that include: ingesting and processing of vast amounts of structured and unstructured data; generating and evaluating a hypothesis; weighing and evaluating responses that are based on relevant evidence; providing situation-specific advice, insights, and guidance; improving knowledge and learning with each iteration and interaction through machine learning processes; enabling decision making at the point of impact (contextual guidance); scaling in proportion to a task; extending and magnifying human expertise and cognition; retaining a high degree of relevant recollection from data points; as well as other functions not specifically mentioned here.

In one aspect, cognitive systems provide mechanisms for answering questions posed to these cognitive systems using a Question Answering pipeline or system (QA system) and/or process requests which may or may not be posed as natural language questions. The QA or request processing pipeline or system is an artificial intelligence application executing on data processing hardware that answers questions or processes requests pertaining to a given subject-matter domain presented in natural language. The QA or request processing pipeline receives inputs from various sources, including input over a network, a database, information from one or more users, and other such inputs from other possible sources of input. Data storage devices can be used to store the corpus of data.

Users input requests to the cognitive system which implements the request processing pipeline. The request processing pipeline responds to the requests using the information in the corpus of data by evaluating the data or portions of data in the corpus, or the like. When a process evaluates the corpus of data to answer the request, the process can use a variety of conventions to query the corpus of data from the request processing pipeline (e.g., sending the query to the request processing pipeline as a well-formed request which is then interpreted by the request processing pipeline and a response is provided containing one or more answers to the request).

The request processing pipeline receives an input request, extracts features from the request, uses the extracted features to formulate queries, and then applies those queries to the corpus of data. Based on the application of the queries to the corpus of data, the request processing pipeline generates a set of hypotheses, or candidate answers/responses to the input request, by looking across the corpus of data for portions of the corpus of data that have some potential for containing a valuable response to the input request. The request processing pipeline then performs deep analysis in each of the portions of the corpus of data found during the application of the queries using a variety of reasoning algorithms. There can be hundreds or even thousands of reasoning algorithms applied, each of which performs different analysis (e.g., comparisons, lexical analysis, or the like, and generates a score).

The scores obtained from the various reasoning algorithms indicate the extent to which the potential response is inferred by the input request based on the specific area of focus of that reasoning algorithm. Each resulting score is then weighted against a statistical model. The statistical model captures how well the reasoning algorithm performed at establishing the inference between two similar data points during a training period of the request processing pipeline. The statistical model is used to summarize a level of confidence that the request processing pipeline has regarding the evidence that the potential response (candidate answer), is inferred by the request. This process is repeated for each of the candidate answers/responses until the request processing pipeline identifies candidate answers that surface as being significantly stronger than others and thus, generates a final answer/response, or ranked set of answers/responses, for the input question/request.

In the context of the illustrative embodiments of the present disclosure, the corpus operated on by the request processing pipeline can include information contained in the component parts catalog 118, with the pipeline operating on an input request for one or more component parts. The request evaluated by the request processing pipeline can include contextual information for one or more specific component parts and/or an end-product. Moreover, candidate responses generated by the request processing pipeline can comprise candidate component part combinations, which can be ranked according to the learned strengths of association between component parts, as well as evaluation of the contextual information, to thereby generate a ranked scoring of the candidate component part combinations. The resulting ranked scoring may be used to provide an output to the MA user interface 104 for use by an assembly person or automated assembly system. A more detailed description of an example method used to select a component part combination is described later in association with FIG. 4.

The build module 116 sends information for a recommended component part combination to the MA user interface 104. The information sent to the MA user interface 104 can include a unique part identifier (e.g., serial number, SKU, UPC, etc.) and location (e.g., bin number, rack number, etc.) for each component part included in the recommended component part combination, as well as any other relevant information used to assemble an end-product. The information can be displayed in a display screen of a client computer (e.g., 130C), passed as an API parameter to a client (e.g., a computer program), printed on paper, and the like.

In some embodiments, the AI assisted product-build service 110 can be implemented in a product repair service environment. A product servicer can use the AI assisted product-build service 110 to obtain recommend component part replacements for end-products being serviced. For example, the product servicer can input information (e.g., part numbers, serial numbers, etc.) for the component part(s) being replaced and other interdependent component parts, and the AI assisted product-build service 110 can recommend a replacement component part(s) using the techniques described above.

As is evident from the above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 1 is provided as an example of one type of data processing system in which aspects of the present invention may be implemented. Many other types of data processing systems may be likewise configured to specifically implement the mechanisms of the illustrative embodiments.

FIG. 1 illustrates that the server/client computers 130A-C included in the system 100 communicate over a network 120. The network 120 can include any useful computing network, including an intranet, the Internet, a local area network, a wide area network, a wireless data network, or any other such network or combination thereof. Components utilized for such a system may depend at least in part upon the type of network and/or environment selected. Communication over the network can be enabled by wired or wireless connections and combinations thereof.

Although FIG. 1 illustrates the system 100 as including a plurality of computers 130A-B that host various software modules and data, it should be understood that in some embodiments, the software modules and data can be hosted on a single computing device. In some embodiments, the modules illustrated in FIG. 1 and discussed above can be implemented as computing services hosted in cloud environment. In some embodiments, a module can be considered a service with one or more processes executing on a server or other computer hardware. Such services can be centrally hosted functionality or a service application that receive requests and provides output to other services or consumer devices. An API can be provided for each module to enable a second module to send requests to and receive output from the first module. Such APIs can also allow third parties to interface with the module and make requests and receive output from the modules.

Figure 3:
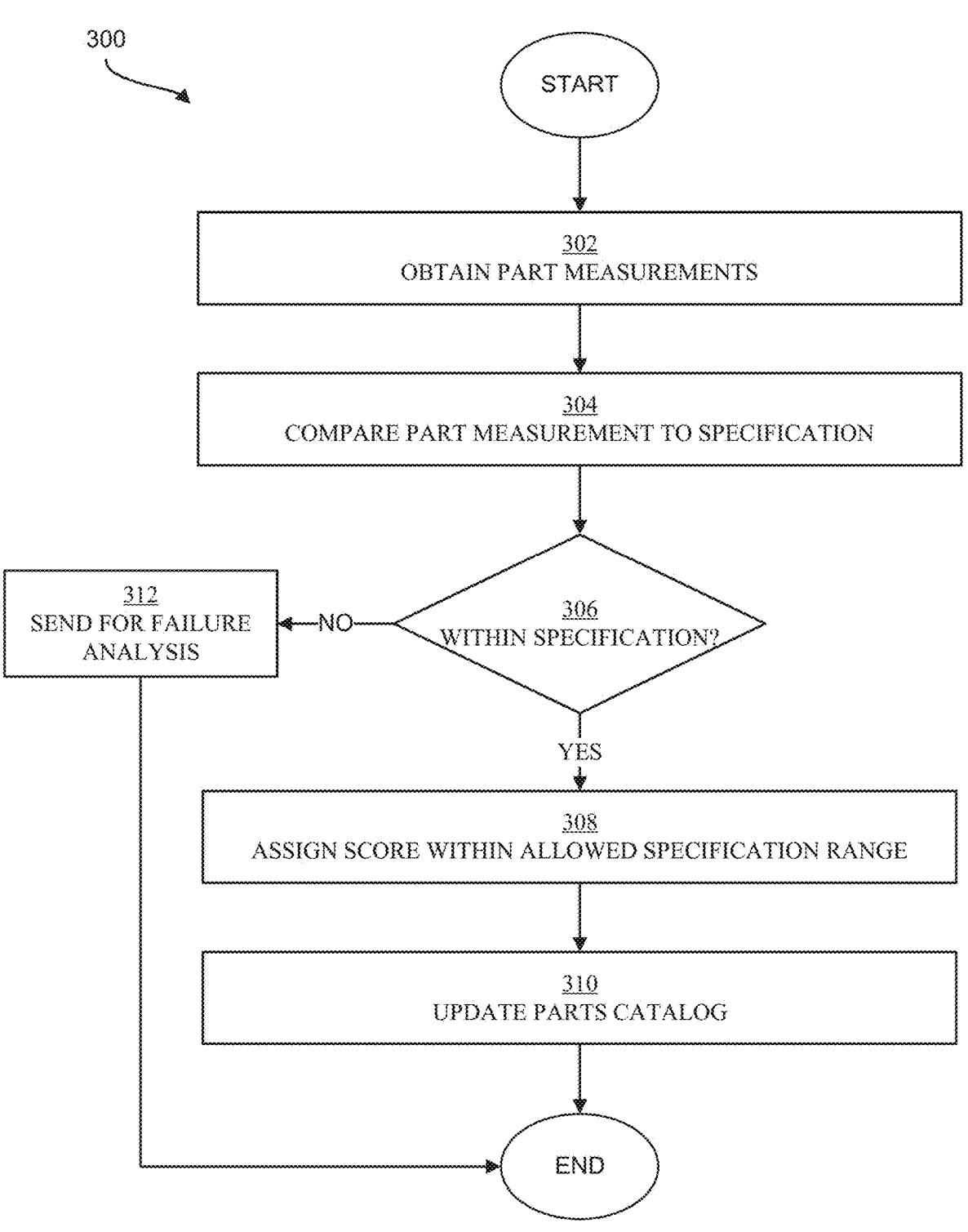
FIG. 3 is a flowchart illustrating an example method for generating a specification score for an aspect of a component part, in accordance with some embodiments of the present disclosure.

FIG. 3 is a flow diagram that illustrates an example method 300 for generating a specification score for a portion or aspect of a component part, in accordance with some embodiments of the present disclosure. In some embodiments, the method 300 can be performed by the scoring module 112 shown in FIG. 1. The specification score generated using the method can be used in AI evaluations of performance data for end-products to determine non-optimal part combinations and to select component part combinations that minimize end-product failures that can be contributed to the component part combination.

The method 300 starts with operation 302 which obtains a part measurement for a portion or aspect of a component part (e.g., a portion of the component part that interacts with another component part). In some embodiments, part measurements are only obtained for component parts identified as being "critical" (e.g., parts that are contributory to the durability of an end-product) and not for other component parts included in the end-product. The part measurement can be obtained using a measurement tool configured to measure the portion or aspect of the component part. Illustratively, a measurement tool can include, but is not limited to, a caliper, micrometer, ruler, scale, torque meter, multimeter, voltmeter, current clamp, sensor (e.g., vision sensor, laser sensor, LED sensor, ultrasonic sensor, contact sensor, eddy current sensor), and the like. The part measurements can comprise mechanical and/or electrical properties, including, dimensions, torque, weight, time, temperature, quantity, luminosity, voltage, current, impedance, and other types of measurements.

Operation 304 compares the part measurement to a specification for the component part. In some embodiments, the specification comprises an allowable tolerance range. In other embodiments, the specification comprises a specific value that the measurement should meet.

Operation 306 determines whether the measurement of the portion or aspect of the component part meets or is within the allowable specification. In the case that the measurement does not meet the specification/tolerance range, then the component part is sent for failure analysis, as shown in operation 312, and is not used in an end-product. In some embodiments, component parts that fail to meet the specification/tolerance range can simply be discarded.

Returning to operation 306, in the case that the component meets the specification/tolerance range, then the method 300 proceeds to operation 308, which assigns a specification score to the component part. In some embodiments, the specification score is normalized to a scale of the specification's allowable tolerance range. As an illustrative example, using the example scoring range, specification, and actual measurement for a component part below:

Scoring Range: 0-100
Component Part Specification: 50 mm+/−2 mm
Actual Measurement: 51.25 mm a normalized specification score can be generated for the component part using the following equation:

$$\frac{Measurement - Spec_{min}}{Spec_{max} - Spec_{min}} * 100 = \frac{51.25 \ mm - 48 \ mm}{52 \ mm - 48 \ mm} * 100 = 81.25$$

In some embodiments, in cases where a measurement of a component part falls slightly out of the specification on either end of the tolerance range, the specification score for the component part can be a negative value (label) or a value (label) that is above the scoring range for the component part. In such cases, there may be an opportunity to pair the component part with another component part that is slightly out of its specification. As an example, a dowel pin having a diameter that is slightly larger than its tolerance range can be paired with a bracket having a hole diameter that is slightly larger than its tolerance range.

In some embodiments, a measurement of a component part can be used directly as a specification score, such that the specification score does not need to be calculated. As an illustrative example based on that above, instead of defining the scoring range as 1-100 and normalizing the measurement to fit the scoring range, the scoring range can simply comprise a range of measurements 48 mm-52 mm, and the specification score for the component part would be its actual measurement of 51.25 mm.

After generating a specification score for the component part, operation 310 updates a record for the component part in the parts catalog (described in association with FIG. 1) with the specification score. The specification score can be associated with a specific part identifier (e.g., serial number) in the parts catalog.

In some embodiments, measuring and scoring of component parts can be performed at a vendor or supplier facility, and the measurements and specification scores can be provided upon shipment to a manufacturing facility. At the manufacturing facility, the component parts can be separated. For example, the component parts can be placed into bins designated for small, medium, and large component parts based on the specification scores of the component parts, thereby simplifying retrieval of the component parts during the build process.

FIG. 4 is a flow diagram illustrating an example method 400 for obtaining an AI assisted component part combination recommendation, in accordance with some embodiments of the present disclosure. The method 400 can be performed by the build module 116 and the component part recommendation module 114 described earlier in association with FIG. 1.

The method 400 starts with operation 402, which determines a critical part group for an end-product. An end-product can have multiple sets of critical part groups. In some embodiments, determining which component parts are critical parts can be performed by an AI model. For example, the AI model can be trained to learn product failure patterns using untagged datasets to determine an optimal combination of component parts based on the component parts that are available (e.g., in stock) for a current build of an individual end-product. The datasets used to train the AI model can include performance data for component parts and specification scores assigned to the component parts. The specification scores indicate where (e.g., a value relative to a scale) within a specification's tolerance range a measurement of a component part falls. The AI model can be trained to identify critical component parts once enough training data has been collected (via field data, lab data, manufacturer provided data, etc.) to construct a failure cluster of a threshold size. Component parts identified as critical parts can be flagged as such in the parts catalog.

Operation 404 receives a user selection of a component part included in the critical part group, and operation 406 obtains a specification score for the component part (e.g., from the parts catalog 118 shown in FIG. 1). In some embodiments, to facilitate the build process, the user can initially select any component part in a critical part group, and information for the selected component part can be input to the AI model to determine other component parts that, when combined with the selected component part, minimize the likelihood of a failure attributable to the component parts.

Operation 408 accesses the AI model to obtain a recommendation for one or more component parts to include in the current critical part group. As described earlier, the AI model uses, at least in part, clustering data of previous end-product failures to determine optimal combinations of component parts. As an illustrative example, in the case that the user selects an upper pump volute (in operation 404), the method 400 determines that the upper pump volute belongs to a critical part group that includes an impeller (in operation 406), and the method 400 accesses the AI model for a recommended combination of upper pump volute and impeller (in operation 408).

In operation 410, the AI model performs a distance measurement to determine a next component part to include in the critical part group. In some embodiments, the method 400 performs a Jaccard distance measurement (shown below) using specification scores to determine the next component part that produces the largest distance from an anomaly cluster of failed end-products included in the clustering data.

$$J(A, B) = \frac{|A \cap B|}{|A \cup B|}$$

J=Jaccard distance
A=set 1
B=set 2

In some embodiments, the specification scores for the component parts being evaluated for the critical parts group can be normalized before performing the distance measurement calculation. In some embodiments, the method 400 performs one calculation to determine an optimal specification score for the next component part to include in the critical part group that results in the largest distance, and the method 400 queries the product catalog for a component part that has the specification score. In other embodiments, the method 400 can perform multiple calculations based on the available component parts within a manufacturing location and output information of an available component part having a specification score that produces the largest distance from an anomaly cluster of failed end-products included in the clustering data.

Operation 412 selects a component part for the critical part group that has the largest distance from the anomaly cluster of failed end-products included in the clustering data. Operation 414 determines whether additional component parts need to be selected for the critical parts group. In the case that additional component parts need to be selected (e.g., a critical part group may be made of two, three, four, or more component parts), the method 400 returns to operation 410 to perform a new distance measurement with the larger set of already selected component parts. In the case that there are no more component parts to be selected for the critical part group, information (e.g., serial numbers, bin numbers, etc.) for the component parts included in the critical part group can be provided to the user (e.g., via a display device, printer, API response, and the like).

FIG. 5 is a flow diagram illustrating an example method for an AI assisted product-build service, in accordance with some embodiments of the present disclosure. Operation 502 obtains measurement data for groups of component parts configured to be assembled as part of an end-product. The measurement data can comprise measurement specifications and actual measurements for interfacing portions of component parts included in the groups of component parts. In some embodiments, the measurement data can be received from a vendor and the measurement data can be stored in a parts catalog that contains information for the groups of component parts that are physically available for assembly of the end-product.

In some embodiments, obtaining the measurement data for the groups of component parts includes querying a parts catalog to determine which of the groups of component parts are physically available for assembly of the end-product. For those component parts that are physically available for assembly of the end-product, the method 500 obtains the measurement data from the parts catalog.

Operation 504 obtains specification scores for the component parts included in the groups of component parts. The specification scores are based at least in part on the measurement specifications and the actual measurements for the interfacing portions of the component parts. In some embodiments, the method 500 assigns a specification score to each component part included in the groups of component parts to indicate where an actual measurement of an interfacing portion of the component part is located in a tolerance range defined in a specification for the component part. In some embodiments, the specification scores for the component parts comprise a numerical value or a label indicating where an actual measurement for a component part is located in a tolerance range defined in a specification for the component part.

Operation 506 selects a component part combination from the groups of component parts using artificial intelligence analysis of the specification scores to determine that the component part combination decreases a probability of a product failure as compared to historical occurrences of the product failure. In some embodiments, the method 500 trains an artificial intelligence model to perform the artificial intelligence analysis. The training can comprise performing a clustering technique to identify a pattern of product failures in a training dataset that are associated with a specific component part combination. The training dataset used to train the artificial intelligence model can include performance data and specification scores associated with historical occurrences of product failures.

In some embodiments, the method 500 receives input for an initial component part to include in a component part combination, and the artificial intelligence analysis performs a distance measurement to determine one or more additional component parts to include in the component part combination. For example, an assembly worker can select a component part from a bin and provide information for the component part (e.g., a serial number, bar code, etc.) via a user interface. A specification score for the component part can be retrieved from a parts catalog, and the specification score can be provided to the artificial intelligence analysis to identify one or more component parts to combine with the initial component part.

In some embodiments, the component part combination forms a critical part group of the end-product that has been historically associated with the product failure. Using the AI analysis to select the component parts in the critical part group forms a subcomponent that is less prone to failure because the interconnections between the component parts have been determined to meet specifications for durability of the component parts.

Operation 508 outputs information for at least one component part included in the component part combination. In some embodiments, outputting the information for the component part combination can comprise sending the information to an automated assembly system to enable the automated assembly system to retrieve component parts that correspond to the information and assemble the end-part using the component parts.

Figure 6:
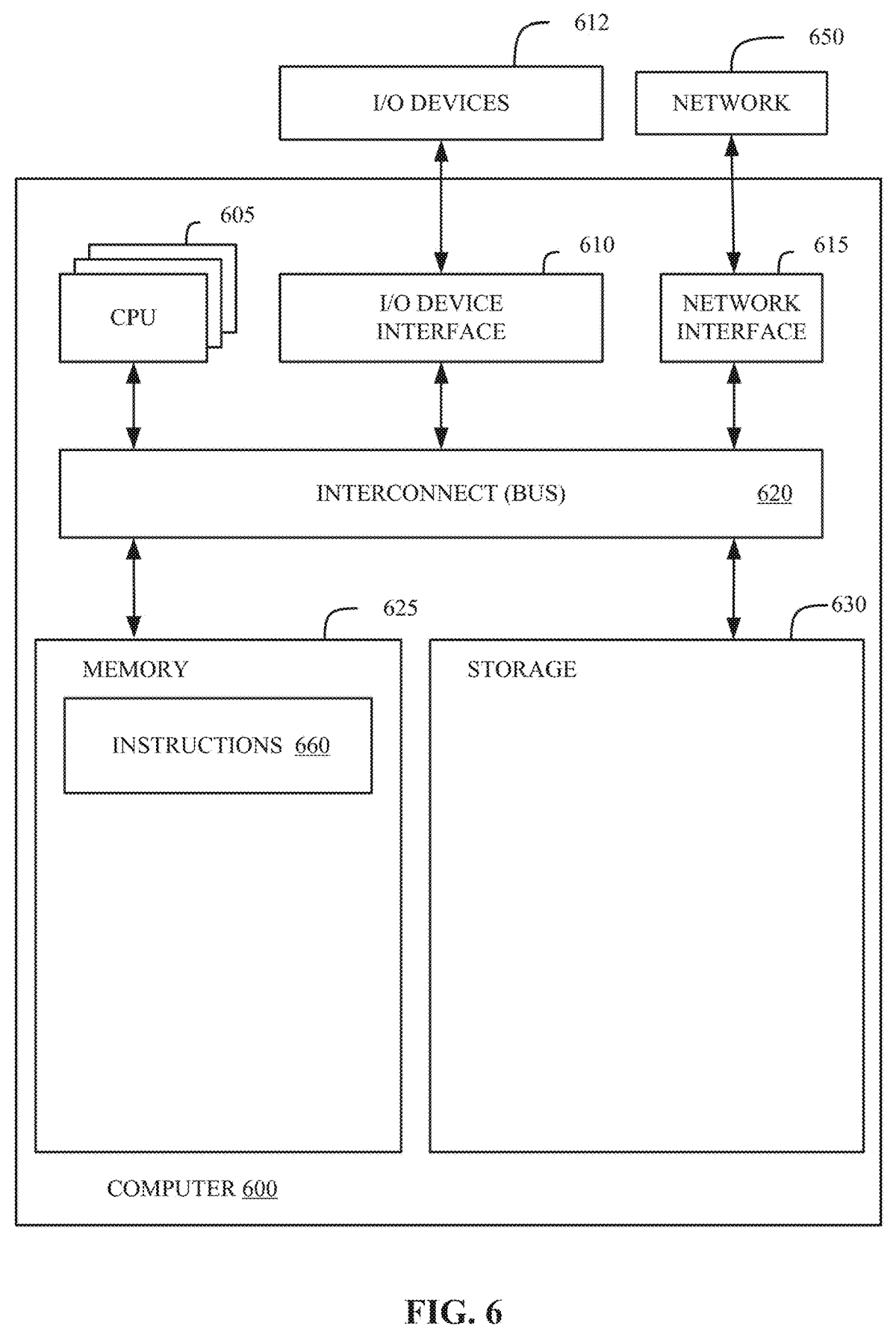

FIG. 6 illustrates a block diagram of an example computer 600 in accordance with some embodiments of the present disclosure. In various embodiments, computer 600 can perform any or all portions of the methods earlier and/or implement the functionality discussed earlier. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine (e.g., the AI assisted product-build service 110 of FIG. 1) such that the client machine executes the method, or a portion of the method, based on the instructions provided by computer 600. In some embodiments, the computer 600 is incorporated into (or functionality similar to computer 600 is virtually provisioned to) one or more entities illustrated in FIG. 1 and/or other aspects of the present disclosure.

Computer 600 includes memory 625, storage 630, interconnect 620 (e.g., a bus), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more buses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random-access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods described earlier and/or implement the functionality discussed earlier. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
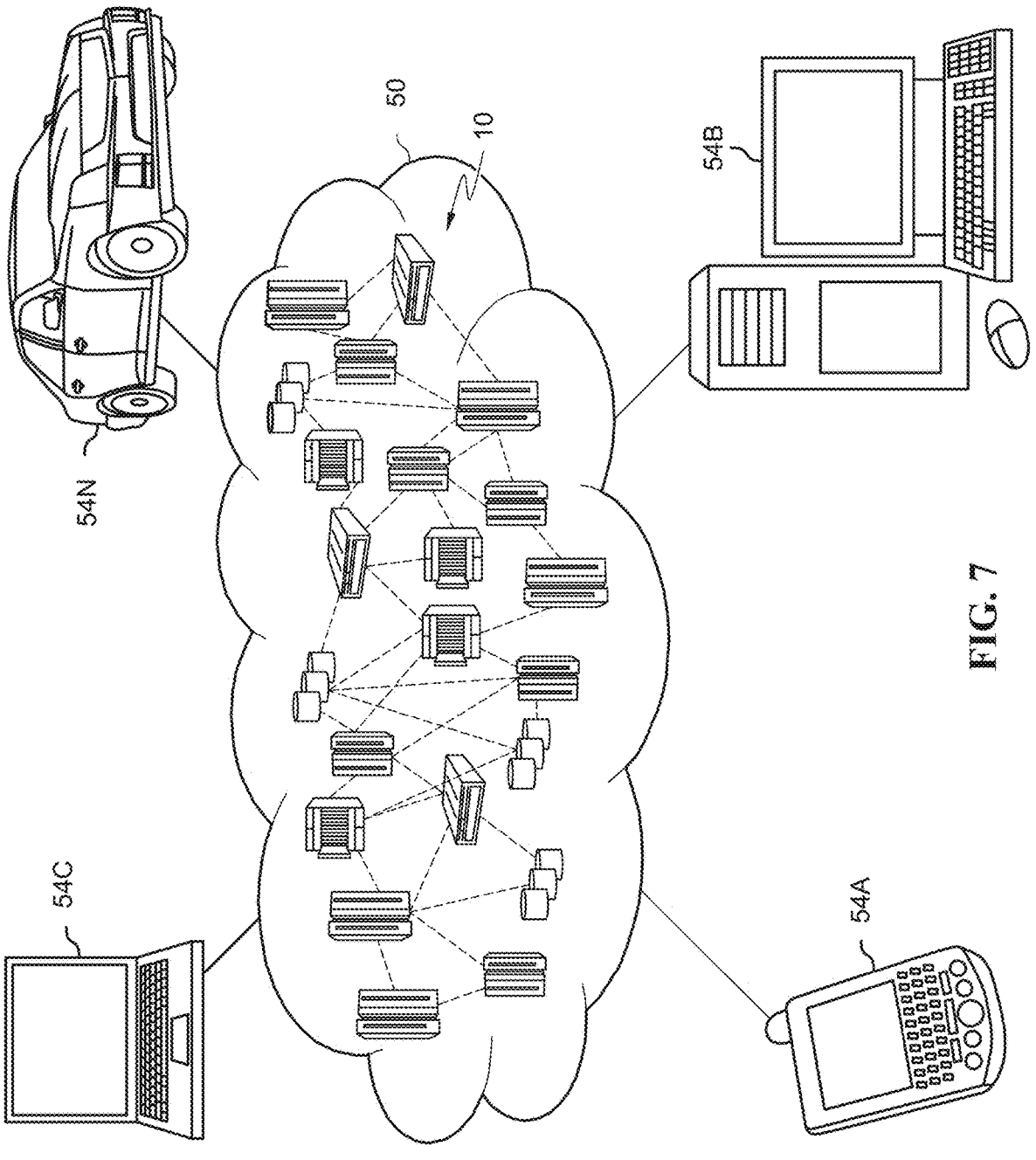
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
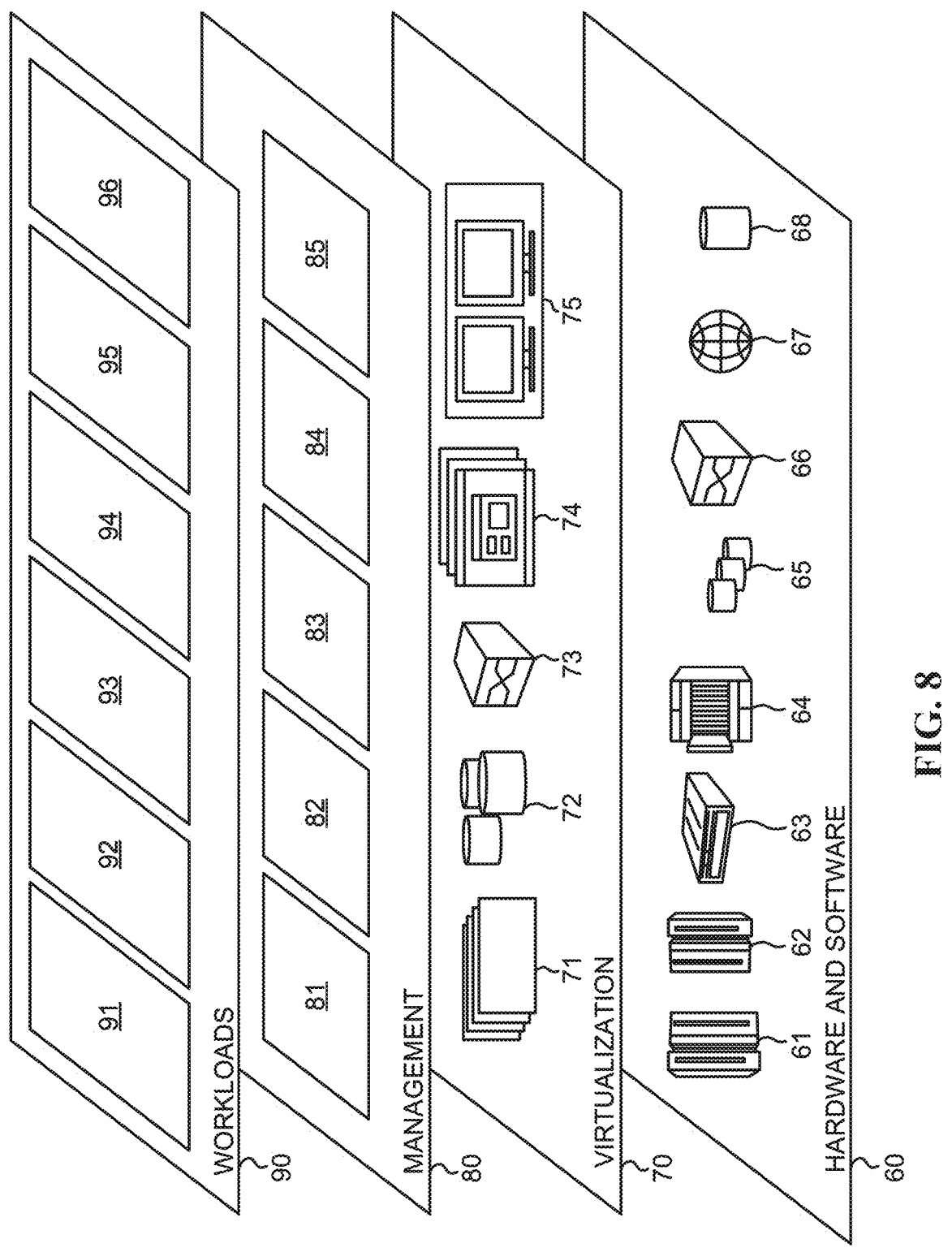
FIG. 8 depicts abstraction model layers provided by a cloud computing environment, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AI assisted product build service 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the methods described with respect to FIGS. 3-5 and/or implement the functionality discussed in FIGS. 1-2 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method, comprising:

training an artificial intelligence model to learn failure patterns associated with component part combinations for an end-product, wherein the training configures the artificial intelligence model to determine component parts for a component part combination that reduce a probability of end-product failure attributable to the component part combination;

obtaining measurement data for groups of component parts configured to be assembled as part of the end-product, wherein the measurement data comprises measurement specifications and actual measurements for interfacing portions of component parts included in the groups of component parts;

obtaining specification scores for the component parts included in the groups of component parts, wherein the specification scores are based at least in part on the measurement specifications and the actual measurements for the interfacing portions of the component parts;

inputting the specification scores for the component parts to the artificial intelligence model to select a component part combination from the groups of component parts, wherein the artificial intelligence model evaluates the specification scores against the learned failure patterns to determine that the component part combination decreases a probability of a product failure as compared to historical occurrences of end-product failures attributable to other component part combinations; and outputting information for at least one component part included in the component part combination to an automated system, wherein responsive to receiving the information, the automated system retrieves the at least one component part for assembly of the end-product.

2. The computer-implemented method of claim 1, wherein the component part combination forms a critical part group of the end-product that has been historically associated with the product failure.

3. The computer-implemented method of claim 1, wherein obtaining the measurement data for the groups of component parts further comprises:

identifying which of the groups of component parts are physically available for assembly of the end-product; and obtaining the measurement data for the groups of component parts that are physically available for assembly of the end-product.

4. The computer-implemented method of claim 1, wherein obtaining the specification scores for the component parts further comprises:

assigning a specification score to each component part included in the groups of component parts to indicate where an actual measurement of an interfacing portion of the component part is located in a tolerance range defined in a specification for the component part.

5. The computer-implemented method of claim 1, wherein a training dataset for training the artificial intelligence model includes performance data and specification scores associated with the historical occurrences of the product failure.

6. The computer-implemented method of claim 1, further comprising receiving input for a first component part to include in the component part combination, wherein the artificial intelligence model performs a distance measurement to determine one or more additional component parts to include in the component part combination.

7. The computer-implemented method of claim 6, wherein the artificial intelligence model uses a Jaccard distance measurement to perform the distance measurement.

8. The computer-implemented method of claim 1, wherein outputting the information for the component part combination further comprises:

displaying the information in a user interface to allow physical retrieval of component parts that correspond to the information.

9. A system, comprising:

one or more computer readable storage media storing program instructions; and one or more processors which, in response to executing the program instructions, are configured to:

train an artificial intelligence model to learn failure patterns associated with component part combinations for an end-product, wherein the training configures the artificial intelligence model to determine component parts for a component part combination that reduce a probability of end-product failure attributable to the component part combination;

obtain measurement data for groups of component parts configured to be assembled as part of an end-product, wherein the measurement data comprises measurement specifications and actual measurements for interfacing portions of component parts included in the groups of component parts;

obtain specification scores for the component parts included in the groups of component parts, wherein the specification scores are based at least in part on the measurement specifications and the actual measurements for the interfacing portions of the component parts;

input the specification scores for the component parts to the artificial intelligence model to select a component part combination from the groups of component parts, wherein the artificial intelligence model evaluates the specification scores against the learned failure patterns to determine that the component part combination decreases a probability of a product failure as compared to historical occurrences of end-product failures attributable to other component part combinations; and output information for at least one component part included in the component part combination to an automated system, wherein responsive to receiving the information, the automated system retrieves the at least one component part for assembly of the end-product.

10. The system of claim 9, wherein the component part combination forms a critical part group of the end-product that has been historically associated with the product failure.

11. The system of claim 9, wherein the instructions configured to cause the one or more processors to obtain measurement data for the groups of component parts are further configured to:

query a parts catalog to determine which of the groups of component parts are physically available for assembly of the end-product; and obtain the measurement data for the groups of component parts that are physically available for assembly of the end-product from the parts catalog.

12. The system of claim 9, wherein the instructions configured to cause the one or more processors to obtain the specification scores for the component parts are further configured to:

assign a specification score to each component part included in the groups of component parts to indicate where an actual measurement of an interfacing portion of the component part is located in a tolerance range defined in a specification for the component part.

13. The system of claim 9, wherein a training dataset for training the artificial intelligence model includes performance data and specification scores associated with the historical occurrences of the product failure.

14. The system of claim 9, further comprising receiving input for a first component part to include in the component part combination, wherein the artificial intelligence model performs a distance measurement to determine one or more additional component parts to include in the component part combination.

15. The system of claim 9, wherein the instructions configured to cause the one or more processors to output the information for the component part combination are further configured to:

send the information to an automated assembly system to enable the automated assembly system to retrieve component parts that correspond to the information and assemble the end-product using the component parts.

16. A computer program product comprising one or more computer readable storage media, and program instructions collectively stored on the one or more computer readable storage media, the program instructions comprising instructions configured to cause one or more processors to:

train an artificial intelligence model to learn failure patterns associated with component part combinations for an end-product, wherein the training configures the artificial intelligence model to determine component parts for a component part combination that reduce a probability of end-product failure attributable to the component part combination;

obtain measurement data for groups of component parts configured to be assembled as part of an end-product, wherein the measurement data comprises measurement specifications and actual measurements for interfacing portions of component parts included in the groups of component parts;

obtain specification scores for the component parts included in the groups of component parts, wherein the specification scores are based at least in part on the measurement specifications and the actual measurements for the interfacing portions of the component parts;

input the specification scores for the component parts to the artificial intelligence model to select a component part combination from the groups of component parts, wherein the artificial intelligence model evaluates the specification scores against the learned failure patterns to determine that the component part combination decreases a probability of a product failure as compared to historical occurrences of end-product failures attributable to other component part combinations; and output information for at least one component part included in the component part combination to an automated system, wherein responsive to receiving the information, the automated system retrieves the at least one component part for assembly of the end-product.

17. The computer program product of claim 16, wherein the instructions configured to cause the one or more processors to obtain the measurement data for the groups of component parts are further configured to:

receive the measurement data from a vendor of the groups of component parts; and store the measurement data in a parts catalog that contains information for the groups of component parts that are physically available for assembly of the end-product.

18. The computer program product of claim 16, wherein the instructions are further configured to cause one or more processors to:

receive input for a first component part to include in the component part combination, wherein the artificial intelligence model performs a distance measurement to determine one or more additional component parts to include in the component part combination.

19. The computer program product of claim 18, wherein the input for the first component part is provided via a user interface for a replacement part service.

20. The computer program product of claim 16, wherein the specification scores for the component parts comprise a numerical value or a label indicating where an actual measurement for a component part is located in a tolerance range defined in a specification for the component part.

\* \* \* \* \*